3,072,711
CITRYL TRIGLUCONIC ACID AND SALTS THEREOF AND PROCESS OF MAKING THE SAME
John L. Jones, 2 Honeyman Place, Berkeley Heights, N.J.
No Drawing. Filed May 20, 1959, Ser. No. 814,414
8 Claims. (Cl. 260—484)

This invention relates to citryl trigluconic acid and metal salts thereof, and to a process of preparing these compounds.

Citric acid has been condensed with an equimolar quantity of gluconic acid or glucono-δ-lactone. The condensation is described in U.S. Patent No. 2,813,892, patented November 19, 1957, to Charles L. Mehltretter, and is performed by heating these compounds at from 100 to 150° C. The gluconic acid is thought to form an ester with the citric acid, probably by reaction of one of the hydroxyl groups of the gluconic acid with one of the carboxylic acid groups of the citric acid, although the possibility of reaction of the carboxylic group of the gluconic acid with the hydroxyl group of the citric acid is not ruled out. Salts are readily formed with alkaline calcium compounds, but these are very unstable in alkaline solution, and even unstable when the pH is well on the acid side, of the order of 3 to 4. Mehltretter describes the preparation of the calcium salts, and the salts obtained in accordance with his procedure are quite alkaline, giving aqueous solutions whose pH is 10 or above.

In accordance with the instant invention, gluconic acid esters of citric acid are provided which are relatively stable in aqueous alkaline solution, and are particularly stable at pH's on the acid side, and the salts of these esters also are stable at such pH's. The citric acid esters of the invention contain an average per molecule of three gluconic acid units, and this high proportion of gluconic acid is believed responsible for the high stability of the aqueous solutions thereof.

The condensation is thought to involve esterification of three carboxylic acid groups of the citric acid with hydroxyl groups of the gluconic acid in accordance with one of the following equations:

I.
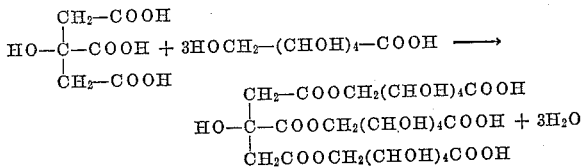

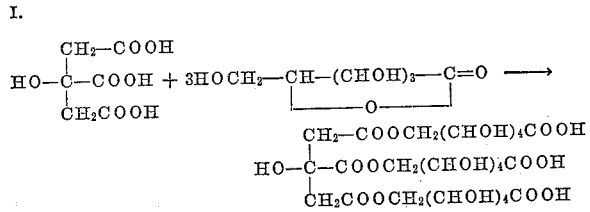

It is, of course, possible that the carboxylic acid group of one of the gluconic acid molecules reacts with the hydroxyl group of the citric acid, instead of as shown above.

It is thought that in addition to the above reactions, one or two hydroxy groups of some gluconic acid molecules react with the free carboxylic acid group of a gluconic acid group already esterified with the citric acid, thus possibly forming a polymer chain of one of the following types:

II.
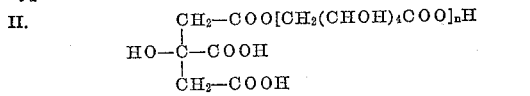

III.
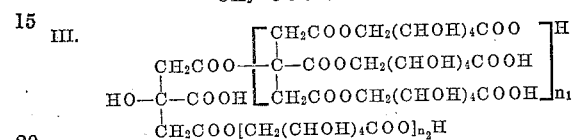

IV.
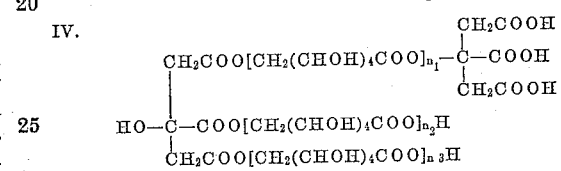

V.
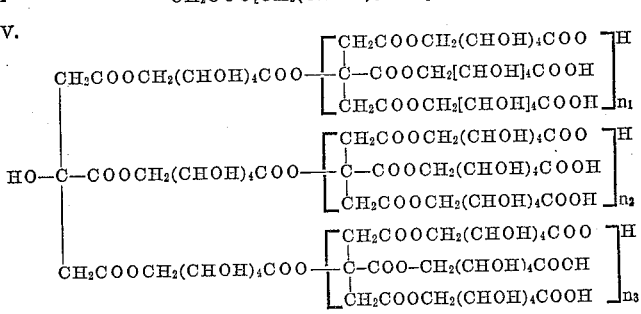

Where $n$, $n_1$, $n_2$ and $n_3$ are the number of units in the polymer chain, and the ratio of citric to gluconic acid residues is about 1:3. The above are merely some of the possible polymers, as those skilled in the art will perceive.

It is thought that on long heating production of the polymer is favored, and that the triester, which is thought to be formed first, is disproportionated to the polymer. For this reason, the gluconic acid esters of citric acid of the invention are referred to simply as citryl trigluconic acid, without commitment as to the structure, for it has not been possible to elucidate the exact structural arrangement of the citric acid and gluconic acid residues in the molecule.

The longer the polymer chain, the fewer the reactive COOH groups per molecule and the lower the metal content of the corresponding salt. The citryl trigluconic acid ester has the highest molar proportion of available COOH groups, and is preferred when a salt of high metal content is required. However, the salts of the polymers are apparently more stable.

The citryl trigluconic acid which is obtained by this reaction has an extraordinary combining power with alkaline metal salts and oxides, for it is capable of reacting with more salt or oxide than can be accounted for by the available carboxylic acid groups. Calcium, for example, is bivalent, and a fully neutralized citryl trigluconic acid would be expected to have 1.5 atomic weights of calcium per molecule. As a matter of fact, analysis has shown the presence of 2.3 and more atomic weights of calcium combined per molecule. This property is not found in the citryl monogluconic acid salt, which in fact reacts only with difficulty to combine as much as 1.5 atomic weights of calcium per molecule. The calcium analyses in the Mehltretter patent show less than this proportion of calcium in his salts.

Citryl trigluconic acid has not yet been isolated in crystalline form from its aqueous solution. Upon concentration, a syrup is formed which has not been made to crystallize, and which has not been completely freed from water. However, the metal salts thereof are solid crystalline compounds, exceedingly soluble in water, and quite stable in aqueous alkaline solution, and are particularly stable in aqueous acid solution.

Citryl trigluconic acid is easily prepared by reacting citric acid and gluconic acid or glucono-δ-lactone in the proportion of approximately three moles of gluconic acid per mole of citric acid in aqueous solution at a temperature within the range from about 80 to about 110° C. Since water is liberated by the esterification, the reaction will also proceed in the absence of water at the start, but this is less convenient. Because of the stability of the ester in the presence of water, the aqueous solution reaction affords no disadvantages, and has the very real advantage of ease of handling in commercial production, and therefore is preferred.

The salts of the acid are readily formed in aqueous solution at room temperature, by reaction of the citryl trigluconic acid with an alkaline compound of the metal whose salt is to be formed. Oxides, hydroxides and alkaline salts such as the carbonates can be used. The amount should somewhat exceed that stoichiometrically required, to obtain a faster reaction.

The salts can be isolated by diluting the resulting solution in methanol in sufficient volume to exceed the solubility of the salt in the resulting aqueous methanol solution. The solid precipitate which forms is isolated by conventional procedures, such as filtration or centrifuging, and can be dried to a powder, at temperatures below its melting point. Products of high purity and good yield are obtainable if the starting materials are also of high purity, since there are no side reactions under these reaction conditions.

The following examples in the opinion of the inventor represent the best embodiments of his invention.

*Example 1*

Citryl trigluconic acid was prepared by mixing in an open container 80.2 g. (0.45 mole) of d-gluconic acid-δ-lactone, 31.5 g. (0.15 mole) of citric acid monohydrate and 25 g. of water. The mixture was allowed to stand for twelve hours at room temperature so as to allow sufficient time for hydrolysis of the lactone. The reaction with the citric acid was effected by heating the mixture at 105° C. for one hour, with occasional stirring during the reaction period. The reaction mixture was allowed to cool, and dissolved in 125 ml. of distilled water.

The solution obtained had a pH of approximately 1.5, and corresponded to citryl trigluconic acid in composition, as determined by analysis for calcium content after formation of the calcium salt by the following method.

To the clear acid solution was added 22 g. of calcium hydroxide, with agitation and external cooling to maintain the temperature of the reaction mixture at below 30° C. The reaction mixture was allowed to stand until the pH had reached 3.8, whereupon the unreacted calcium hydroxide was removed by filtration. The clear filtrate was poured in a thin stream into 1000 ml. of absolute methanol, with rapid stirring. A white solid precipitate formed, and this was removed by filtration and washed with 500 ml. of methanol, followed by 100 ml. of ethyl ether, after which it was dried at 50° C. for fifteen hours. The yield of product was 100 g. of solid white crystals, containing 9.8% calcium (11.1% on a dry basis) and 6.2% moisture. This corresponds to a product containing 2.3 atomic weights of calcium and 6 moles of water per mole of citryl trigluconic acid, approximately 0.8 atomic weight more calcium than is theoretically possible, based on the 1.5 atomic weights of calcium which can react with the three carboxylic acid groups per mole of the acid. The salt was quite stable, even in aqueous solution, and infinitely soluble in water.

*Example 2*

To a portion of clear acid solution prepared as set forth in Example 1 was added 33 g. of magnesium carbonate trihydrate, with stirring and external cooling such that the temperature during addition did not exceed 25° C., and excessive foaming was prevented. The reaction mixture was allowed to stand until the pH of the solution reached 4.6, and the unreacted magnesium carbonate trihydrate was then removed by filtration. The clear filtrate was poured in a thin stream into a mixture of 1000 ml. of absolute methanol and 200 ml. of acetone. The white solid precipitate which formed was filtered, washed with ethyl ether, and dried at 50° C. for about sixteen hours. The yield of product was 88 g., containing 7.8% magnesium (8.8% on a dry basis) and 12.1% moisture. This corresponds to 2.9 atomic weights of magnesium per mole of citryl trigluconic acid, 1.4 more atomic weights than is theoretically possible, based on the available carboxylic acid groups of the acid. The product was quite stable, even in aqueous solution, and infinitely soluble in water.

*Example 3*

A citryl trigluconic acid solution was prepared as set forth in Example 1, using one-half the amounts set forth. To the resulting solution was added 0.4 mole of freshly prepared ferrous hydroxide, with agitation and external cooling to maintain the temperature throughout the addition at about 25° C. The reaction was allowed to continue by permitting the mixture to stand at room temperature until the pH of the solution reached 4.6, whereupon the unreacted ferrous hydroxide was removed by filtration. The filtrate was poured in a thin stream into a mixture of 800 ml. of absolute methanol and 1600 ml. of acetone. A dark green solid precipitate was formed, and this was filtered, washed with ether and dried at 50° C. for about sixteen hours. The yield of product was 65 g., and this contained 16.7% ferrous iron and 1.6% ferric iron (equivalent to 20.7% ferrous and 2% ferric iron on a dry basis) and 20.9% moisture. This corresponded to 2.7 atomic weights of ferrous iron and 0.25 atomic weight of ferric iron per mole of acid. The product was quite stable, even in aqueous solution, and was infinitely soluble in water.

*Example 4*

To a clear aqueous solution of citryl trigluconic acid prepared as set forth in Example 1 was added approximately 80 g. of reduced iron powder and the temperature was held at 35° C.±5° C. by external heating for seven hours. At the end of this time, the pH of the solution was about 6.1. Unreacted iron was removed by filtration, and the filtrate poured in a thin stream into 750 ml. of absolute methanol. A dark green solid precipitate was formed, and this was washed with methanol and then with ethyl ether, and dried under vacuum over $P_2O_5$ for about twenty-two hours. Approximately 150 g. of product was obtained, containing 16.9% ferrous iron and 1.6% ferric iron. The product was quite stable even in aqueous solution, and infinitely soluble in water.

*Example 5*

Citryl triglutonic acid was prepared by mixing in an open container 80.2 g. (0.45 mole) of d-gluconic acid-α-lactone, 31.5 g. (0.15 mole) of citric acid monohydrate and 25 g. of water. The mixture was allowed to stand for twelve hours at room temperature so as to allow sufficient time for hydrolysis of the lactone. The reaction with the citric acid was effected by heating the mixture at 105° C. for four hours, with occasional stirring during the reaction period. The reaction mixture was allowed to cool, and dissolved in 125 ml. of distilled water.

The solution obtained had a pH of approximately 1.5, and corresponded to citryl trigluconic acid in composition, as determined by analysis for calcium content after formation of the calcium salt by the method of Example 6.

*Example 6*

To the clear citryl trigluconic acid solution obtained in Example 5 was added 22 g. of calcium hydroxide, using agitation and external cooling to maintain the temperature at below 30° C. throughout the addition. The solution was allowed to stand at this temperature until the pH reached 3.8. Unreacted calcium hydroxide was removed by filtration. The clear filtrate was poured in a thin stream into 1000 ml. of absolute methanol, with rapid stirring. A white solid precipitate formed, and this was removed by decantation and reslurried in 300 ml. of absolute methanol. The slurrry was filtered and the white precipitate dried at 50° C. for about sixteen hours. The yield of calcium citryl trigluconate was 115 g., and the product contained 9.7% calcium (10.5% on a dry basis) and 7.3% moisture. This corresponded to approximately 2 atomic weights of calcium per mole of the citryl trigluconic acid, approximately ½ more atomic weight than is accounted for by the available carboxylic acid groups of the acid. The product was quite stable, even in aqueous solution, and was infinitely soluble in water.

*Example 7*

Example 5 was repeated, reacting the citric acid and hydrolyzed gluconic acid-δ-lactone at 110° C. for seven and one-half hours. A solution was obtained having a pH of approximately 1.5, corresponding in composition as shown by analysis to citryl trigluconic acid.

*Example 8*

To the clear acid solution of Example 7 was added 22 g. of calcium hydroxide, with agitation and external cooling to maintain the temperature of the reaction mixture at below 30° C. The reaction mixture was allowed to stand until the pH had reached 3.8, whereupon the unreacted calcium hydroxide was removed by filtration. The clear filtrate was poured in a thin stream into 1650 ml. of absolute methanol, with rapid stirring. A white solid precipitate formed, and this was removed by filtration and washed with 500 ml. of methanol, after which it was dried at 50° C. for fifteen hours. The yield of product was 107 g. of solid white crystals, containing 8.9% calcium (9.5% on a dry basis) and 6.2% moisture. This corresponds to a product containing 1.9 atomic weights of calcium and about 3 moles of water per mole of citryl trigluconic acid, approximately 0.8 atomic weight more calcium than is theoretically possible, based on the 1.5 atomic weights of calcium which can react with the three carboxylic acid groups per mole of the acid. The salt was quite stable, even in aqueous solution, and infinitely soluble in water.

The metal salts of citryl trigluconic acid because of their solubility in water and their pH, normally on the acid side but which can be brought to a neutral or alkaline pH by addition of the base of the corresponding metal in sufficient amount, if desired, are valuable sources of these metals for human and animal therapy. They are quite versatile because of their solubility in water, and can be used in a great variety of compositions to remedy nutritive deficiencies of various types, such as calcium, magnesium and iron deficiencies. They can be formulated in compositions for injection, both intravenously and intramuscularly, and for oral administration.

For example, the calcium salt can be supplied in physiological saline solution, containing 1 gram of the calcium citryl trigluconate per 10 cc. A typical composition for intramuscular injection is supplied in 1 cc. ampules containing 10 mg. thiamine hydrochloride, 0.5 cc. of liver extract and 20 mg. of the calcium citryl trigluconate, buffered as necessary to an appropriate pH.

The magnesium salts are useful as laxatives, alone and in conjunction with antacid mixtures. They also may be used as a substitute for magnesium sulfate, and employed for parenteral administration as an anticonvulsant, a central depressant or a dehydrant.

The iron salts may be used as iron supplements for both oral and intravenous administration. They also may be used as soil supplements to cure plant chlorosis, particularly in the citrus fruit region. In this area, they may serve as a substitute for the iron chelate of ethylene diamine tetraacetic acid.

Citryl trigluconic acid itself may be useful in the decalcification of bone and teeth, and as a chelating agent or sequestrant because of its ability to bind or combine with more metal ion than is theoretically possible per carboxylic acid group. As a sequestrant or chelating agent it may be used, for example, to sequester calcium in drilling muds to control flocculation, to prevent precipitation of insoluble iron compounds by injection in oil reserves, in the prevention and removal of scale in pipe systems, in the cleaning and surface treatment of metals, and in the control of iron.

I claim:
1. Citryl trigluconic acid and metal salts thereof.
2. Citryl trigluconic acid.
3. Water-soluble metal salts of citryl trigluconic acid.
4. Calcium citryl trigluconate.
5. Magnesium citryl trigluconate.
6. Iron citryl trigluconate.
7. A process for preparing citryl trigluconic acid which comprises reacting in aqueous solution at a temperature within the range from about 80 to about 110° C. citric acid and approximately three moles of a member of the group consisting of gluconic acid and glucono-δ-lactone per mole of citric acid.
8. A process for forming metal salts of citryl trigluconic acid which comprises reacting citryl trigluconic acid in aqueous solution with an amount of an alkaline compound of the corresponding metal sufficient to form a salt with a carboxylic group of the acid, diluting the resulting solution with a water-miscible organic liquid in which the salt is insoluble in sufficient amount to precipitate the salt, and recovering the resulting precipitate.

References Cited in the file of this patent

UNITED STATES PATENTS

| | | |
|---|---|---|
| 2,118,985 | Schmidt et al. | May 31, 1938 |
| 2,813,892 | Mehltretter | Nov. 19, 1957 |